Aug. 2, 1932.   J. T. WELCH   1,870,078
REEL SEAT FOR FISHING RODS
Filed Nov. 15, 1929
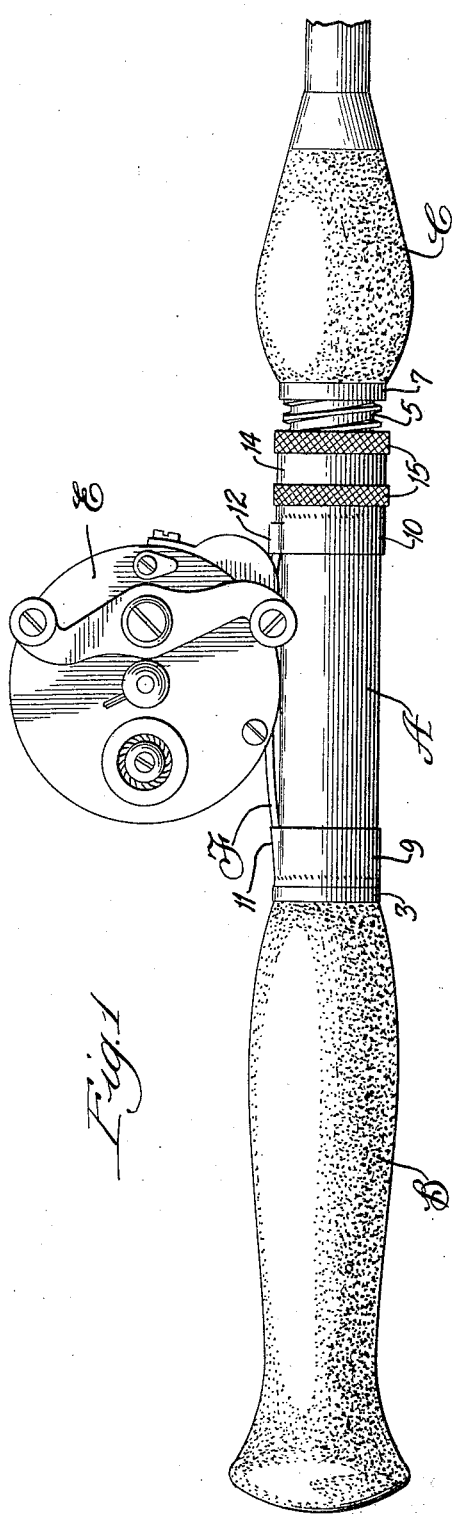
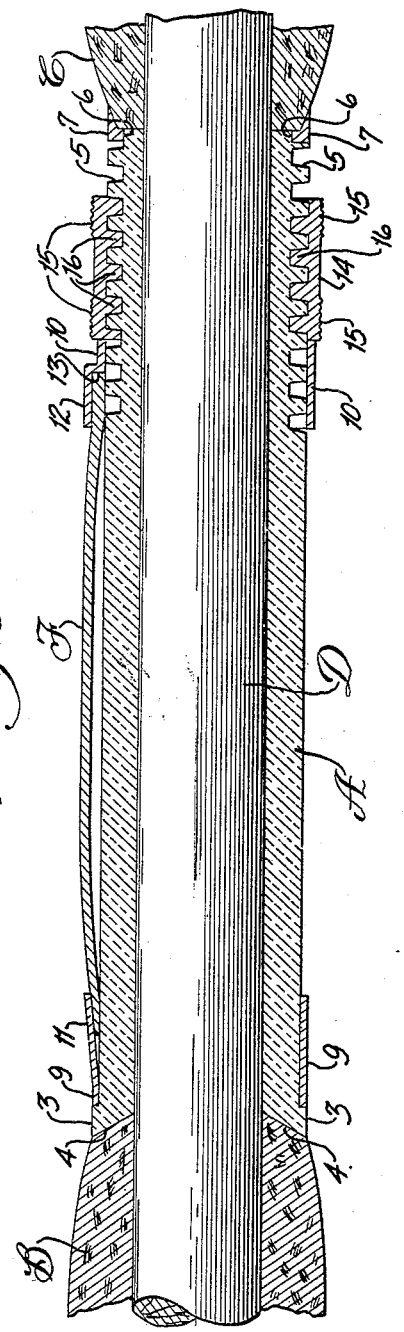
Inventor:
Jack T. Welch,
By Fleming & Fleming
Attys Patented Aug. 2, 1932

1,870,078

UNITED STATES PATENT OFFICE

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN

REEL SEAT FOR FISHING RODS

Application filed November 15, 1929. Serial No. 407,328.

My invention which relates generally to fishing rods is concerned more particularly with a reel seat therefor adapted to be assembled on the rod adjacent its handle. The present reel seat includes, by preference, a barrel, desirably formed from a suitable material capable of being moulded to shape, together with associated clamping elements slidably fitted on the barrel whereby to simplify the process of producing and assembling these components.

Further objects, as will hereinafter appear, are also attained by this invention which is fully described in the following specification taken in conjunction with the accompanying drawing, in which—

Figure 1 is a view in elevation of the handle end of a fishing rod equipped with a reel which is mounted on my improved reel seat; and Fig. 2 is an enlarged view in longitudinal section showing the components of the reel seat.

By way of a suggestive embodiment, I have shown a barrel A having walls of substantial thickness such as may be produced by a casting operation, placed between a rear handle grip B and a forward handle grip C, the barrel and the two handle grips being mounted adjacent one end of a fishing rod D, in accordance with usual practice. A fishing reel E having a base plate F is carried on a reel seat which includes the barrel just mentioned.

This barrel is provided at one end, preferably its rear end, with a head 3 having in its rear face an angular undercut 4 adapted to encase a portion of the handle B. Formed in the surface of the barrel adjacent its opposite end are threads 5, preferably square in cross section, the tops of such threads having a substantial area and lying flush with the remainder of the surface of the barrel. The extremity of the barrel which is reduced in diameter is formed with a shoulder 6 on which is fitted a ferrule 7 for encasing one end of the forward handle grip C. The external diameter of this ferrule is the same as that of the barrel.

Closely fitted on the barrel are two clamping rings 9 and 10, the former adapted to lie adjacent the head 3 and provided with a tapering hooded socket 11 for receiving one end of the reel base plate F. The other clamping ring is also provided with a hooded socket 12 to receive the opposite end of the reel base plate. This last socket is shouldered at 13 so as to positively abut the end of the reel base plate, thereby preventing longitudinal movement thereof. The clamping ring 10 is of such internal diameter and length as to be freely slidable upon the barrel, but without loose movement or play thereupon.

A follower ring 14, preferably knurled on its exterior as at 15, is provided throughout its length with inwardly projecting threads 16 adapted to cooperate with the threaded portion of the barrel. One end of the follower abuts the clamping ring 10 and exerts thereon a uniform pressure throughout its circumference whereby to advance the ring to clamping position. The outside diameter of the threads 16 is preferably of the same diameter as the corresponding dimension of the barrel, thereby conducing to an accurate fitting of the clamping ring 10 over the threaded portion of the barrel. Because of this circumstance the threads may extend for a greater distance along the barrel to increase the adjustment range of the clamping ring, thereby adapting it for use with various length of reel bases.

From the foregoing description it will be noted that my improved seat will accommodate reel bases varying greatly in length, that the reel is held firmly against longitudinal movement by the follower ring, the thrust from which also prevents any lateral movement thereof due to the wedging action which takes place at the clamping ring 9, that the several seat components may be assembled with the utmost ease, and that the cost of manufacture is reduced by forming the barrel in the manner suggested.

I claim:

1. A reel seat in which is combined a barrel of substantially uniform diameter having along a substantial portion thereof inwardly formed threads with top surfaces of substantial area and in flush relation with the remainder of the barrel surface, a pair of opposed clamping rings fitted upon the barrel adapted to engage between them the base plate of a reel, one of said rings being mounted for free sliding movement upon the barrel and to receive bearing from either or both the threaded and unthreaded portions of its surface, and a follower ring mounted upon the barrel for abutment against the outer end of the sliding clamping ring, the follower ring being provided throughout its length with internal threads complementary to and coacting with those on the barrel, adapted with rotation of the follower ring to advance the same toward or from the sliding clamping ring.

2. A reel seat in which is combined a barrel of substantially uniform diameter having at one end a head and along a substantial portion thereof inwardly formed threads with top surfaces flush with the remainder of the barrel surface, a pair of opposed clamping rings fitted upon the barrel adapted to engage between them the base plate of a reel, both of said rings being fitted closely upon the barrel with one of them abutting the head at one end thereof, and the other ring being slidable along the barrel and to receive bearing from either or both the threaded and unthreaded portions of its surface, and a follower ring mounted upon the barrel for abutment against the outer end of the clamping ring last noted, the follower ring being provided with internal threads complementary to and coacting with those on the barrel adapted with rotation of the follower ring to advance the same toward or from the proximate clamping ring.

3. A reel seat in which is combined a barrel of substantially uniform diameter having at one end thereof a reduced extension forming a shoulder, a ferrule fitted on the shoulder to lie flush with the surface of the barrel, threads inwardly formed along a substantial portion of the barrel and terminating at the ferrule having the top surfaces of the thread flush with the remainder of the barrel surface, a pair of opposed clamping rings fitted closely upon the barrel adapted to be moved to operative positions over the barrel and tops of the threads formed in the barrel, one of the clamping rings being movable along the barrel and to receive bearing from either or both the threaded and unthreaded portions of its surface, and a follower ring mounted upon the barrel for abutment against the outer end of one of the clamping rings, the follower ring being provided with inturned threads complementary to and coacting with those on the barrel adapted with rotation of the follower ring to advance the same toward or from the sliding clamping ring.

4. A reel seat in which is comprised a barrel of substantially uniform diameter having at one end a head with concave end face for encasing the proximate handle grip of a fishing rod, screw threads formed along a substantial portion of the barrel and extending inwardly from the exterior surface thereof, a shoulder of reduced diameter on the threaded barrel end, a ferrule seated on the shoulder and encasing the proximate handle grip of the fishing rod, and a pair of clamping rings and a follower ring fitted closely upon the barrel, the latter having screw threads coacting with the barrel threads whereby, with rotation, to advance thereupon against the proximate clamping ring to slide the latter toward the other clamping ring which is adapted to engage the barrel head.

In testimony whereof, I have hereunto set my hand this 12th day of November, 1929.

JACK T. WELCH.